United States Patent
Urabayashi et al.

(10) Patent No.: US 12,428,757 B2
(45) Date of Patent: Sep. 30, 2025

(54) GLASS CLOTH, PREPREG, AND PRINTED WIRING BOARD

(71) Applicant: NITTO BOSEKI CO., LTD., Fukushima (JP)

(72) Inventors: Yuhei Urabayashi, Fukushima (JP); Hirotaka Ikejiri, Fukushima (JP); Naoto Kanno, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 19/116,643

(22) PCT Filed: Mar. 21, 2024

(86) PCT No.: PCT/JP2024/011104
§ 371 (c)(1),
(2) Date: Mar. 28, 2025

(87) PCT Pub. No.: WO2024/203751
PCT Pub. Date: Oct. 3, 2024

(65) Prior Publication Data
US 2025/0257504 A1  Aug. 14, 2025

(30) Foreign Application Priority Data
Mar. 31, 2023  (JP) ................................ 2023-057561

(51) Int. Cl.
*D03D 15/267* (2021.01)
*C08J 5/24* (2006.01)
(Continued)

(52) U.S. Cl.
CPC ............ *D03D 15/267* (2021.01); *C08J 5/244* (2021.05); *C08K 7/14* (2013.01); *C08K 9/06* (2013.01);
(Continued)

(58) Field of Classification Search
CPC ...... D03D 15/267; D03D 13/008; D03D 1/00; C08J 5/24; C08J 2363/00; C08K 7/14; C08L 9/05; D10B 2101/06; H05K 1/03
(Continued)

(56) References Cited

U.S. PATENT DOCUMENTS 5,662,990 A  9/1997  Scari et al.
2018/0305846 A1 * 10/2018  Tachibana ............ D03D 1/0082

FOREIGN PATENT DOCUMENTS

JP  H01-249333 A  10/1989
JP  H07-102483 A  4/1995
(Continued)

OTHER PUBLICATIONS

PCT/ISA/210 from International Application PCT/JP2024/011104 with the English translation thereof.
PCT/ISA/237 from International Application PCT/JP2024/011104.

*Primary Examiner* — Camie S Thompson
(74) *Attorney, Agent, or Firm* — Carrier, Shanda & Associates P.C.; Joseph P. Carrier; Fulchand P. Shende

(57) ABSTRACT

The glass cloth of the present invention includes glass strands 1 as warp threads and weft threads, the glass strands 1 each being composed of a plurality of glass filaments 2, and has a blocking variance number in the range of 0.027 to 0.077, the blocking variance number represented by the following expression (1):

$$|B_{max}-B_{min}|/N \ldots \quad (1)$$

wherein, assuming that a warp glass strand is divided into three regions of a left region, a center region, and a right region with equal widths in a width direction of the warp glass strand, and number of blockings is counted in each of the regions, $B_{max}$ denotes a maximum value of number of (Continued)

blockings, $B_{min}$ denotes a minimum value of number of blockings, and N denotes number of glass filaments included in the warp glass strand.

3 Claims, 1 Drawing Sheet

(51) Int. Cl.
    *C08K 7/14*     (2006.01)
    *C08K 9/06*     (2006.01)
    *D03D 13/00*     (2006.01)

(52) U.S. Cl.
    CPC ........ *D03D 13/008* (2013.01); *C08J 2363/00* (2013.01); *D10B 2101/06* (2013.01)

(58) Field of Classification Search
    USPC .......................................................... 442/60
    See application file for complete search history.

(56) References Cited

FOREIGN PATENT DOCUMENTS

| | | |
|---|---|---|
| JP | H09-503256 A | 3/1997 |
| JP | H09-324340 A | 12/1997 |

\* cited by examiner

GLASS CLOTH, PREPREG, AND PRINTED WIRING BOARD

TECHNICAL FIELD

The present invention relates to a glass cloth, a prepreg, and a printed wiring board.

BACKGROUND ART

Warp glass strands that are used for warp threads of glass cloths are conventionally coated with a warp-protecting agent to prevent the warp glass strands from being damaged through contact with a reed or heddles in weaving (e.g., see Patent Literature 1).

CITATION LIST

Patent Literature

Patent Literature 1: Japanese Patent Laid-Open No. 7-102483

SUMMARY OF INVENTION

Technical Problem

However, glass cloths woven with such warp glass strands coated with a warp-protecting agent suffer from a disadvantage of local unevenness of time required for complete permeation of resin through warp glass strands (hereinafter, occasionally referred to as impregnation time). In producing a prepreg by impregnating a glass cloth including warp glass strands that cause uneven impregnation time with resin, fitting the time to soak the glass cloth in the resin to short-impregnation-time parts contained in the warp glass strands in the glass cloth disadvantageously results in reduction in close adhesion between long-impregnation-time parts contained in the warp glass strands in the glass cloth and the resin. The reduction in close adhesin between the glass cloth and the resin, even though the reduction is merely partial, contributes to reduction in insulation reliability as a whole of the prepreg including the glass cloth. On the other hand, fitting the time to soak the glass cloth in the resin to long-impregnation-time parts of the warp glass strands results in need of longer time for prepreg production, and thus deteriorated production efficiency.

An object of the present invention is to solve the disadvantages and provide a glass cloth that is capable of preventing unevenness of resin impregnation time for warp glass strands.

Solution to Problem

The present inventors examined the reason for the local unevenness of resin impregnation time for warp glass strands in a glass cloth woven with the warp glass strands coated with a warp-protecting agent. From the result, the present inventors have found that in the warp glass strands coated with a warp-protecting agent, a dried state causes generation of a region called a blocking in a plurality of glass filaments constituting the warp glass strands, and there is a weak correlation between the distribution of number of such blockings in warp glass strands and the insulation reliability of a prepreg including a glass cloth woven with the warp strands, even though the correlation is far weaker than the influence of a silane coupling agent with which the surface of a glass cloth is coated. The term blocking refers to a tightly closed region that is formed through the process that three or four of the glass filaments constituting a warp glass strand come into tight contact with each other on their peripheral surfaces, and surrounded by the outer peripheral surfaces of the three or four glass filaments in the cross-section perpendicular to the length direction of the warp glass strand.

The expression "tightly closed" means that the shortest distance between the outer peripheral surface of one of two glass filaments in contact and that of the other is less than 0.3 km.

The present inventors further examined on such blockings, and have found that a glass cloth having a blocking variance number in a specific range is capable of preventing unevenness of resin impregnation time for the warp glass strands of the glass cloth.

To achieve the object, the glass cloth of the present invention includes glass strands as warp threads and weft threads, the glass strands each being composed of a plurality of glass filaments, and is characterized by having a blocking variance number in the range of 0.027 to 0.077, the blocking variance number represented by the following expression (1):

$$|B_{max} - B_{min}|/N \ldots \quad (1)$$

wherein, assuming that a warp glass strand is divided into three regions of a left region, a center region, and a right region with equal widths in a width direction of the warp glass strand, and number of blockings is counted in each of the regions, $B_{max}$ denotes a maximum value of number of blockings, $B_{min}$ denotes a minimum value of number of blockings, and N denotes number of glass filaments included in the warp glass strand.

Having a blocking variance number in that range, the glass cloth of the present invention is capable of preventing unevenness of resin impregnation time for the warp glass strands in the whole of the glass cloth in impregnating the glass cloth with resin, and hence successfully achieves superior close adhesion between the glass cloth and resin when being processed into a prepreg, without deteriorating the production efficiency for the prepreg.

The expression "capable of preventing unevenness of resin impregnation time for the warp glass strands" means that variation in resin impregnation time for warp glass strands as measured with a method described later is 1.0 minute or less.

If the glass cloth of the present invention has a blocking variance number of more than 0.077, unevenness of resin impregnation time for warp glass strands is locally generated, and when being processed into a prepreg, the glass cloth causes deteriorated production efficiency for the prepreg or fails to achieve superior close adhesion between the glass cloth and resin. If the glass cloth of the present invention has a blocking variance number of less than 0.027, glass strands tend to stick together, and the generation of fluff and breakage cannot be prevented.

The prepreg and printed wiring board of the present invention are characterized by including the glass cloth of the present invention.

DESCRIPTION OF EMBODIMENTS

Figure 1:
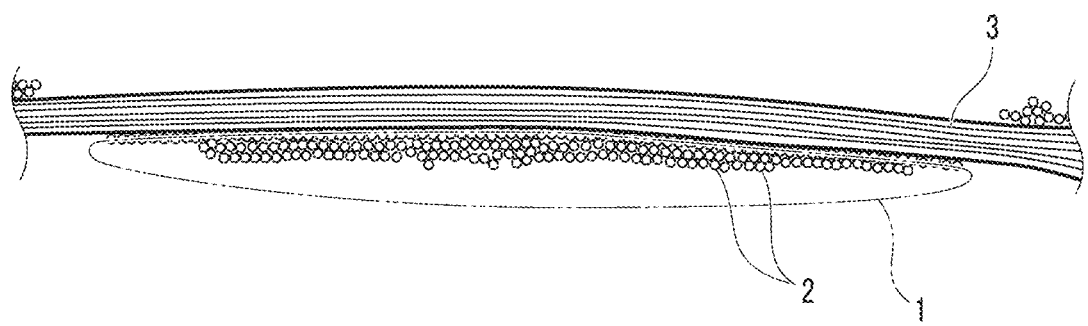
FIG. 1 is a reproduction of an electron micrograph showing a cross-section of warp glass strands to be used for the glass cloth of the present invention.

Next, modes of implementation of the present invention will be described in more detail with reference to the attached drawings.

The glass cloth of the present embodiment is a glass cloth including glass strands as warp threads and weft threads, the glass strands each being composed of a plurality of glass filaments, wherein the glass cloth has a blocking variance number in the range of 0.027 to 0.077, the blocking variance number represented by the following expression (1):

$$|B_{max} - B_{min}|/N \dots \quad (1)$$

wherein, assuming that a warp glass strand is divided into three regions of a left region, a center region, and a right region with equal widths in a width direction of the warp glass strand, and number of blockings is counted in each of the regions, $B_{max}$ denotes a maximum value of number of blockings, $B_{min}$ denotes a minimum value of number of blockings, and N denotes number of glass filaments included in the warp glass strand.

Having a blocking variance number in that range, the glass cloth of the present embodiment is capable of preventing unevenness of resin impregnation time for the warp glass strands in the whole of the glass cloth in impregnating the glass cloth with resin, and hence successfully achieves superior close adhesion between the glass cloth and resin when being processed into a prepreg, without deteriorating the production efficiency for the prepreg.

The blocking variance number of the glass cloth of the present embodiment is preferably in the range of 0.045 to 0.070, and more preferably in the range of 0.055 to 0.064.

The glass cloth of the present embodiment can be produced, for example, as follows.

First, a glass raw material formulated to have a glass composition for glass fiber with desired composition is melted in a glass melting furnace to form molten glass (melt of glass composition for glass fiber).

For the glass cloth of the present embodiment, the glass composition for glass fiber is not limited, and examples thereof can include E glass composition, which is the most versatile, high-strength high-elastic-modulus glass composition, high-elastic-modulus easy-production glass composition, and low-dielectric-constant low-loss-tangent glass composition.

The E glass composition is a composition containing $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass to the total amount of glass fiber.

The high-strength high-elastic-modulus glass composition is a composition containing $SiO_2$ in the range of 60.0 to 70.0% by mass, $Al_2O_3$ in the range of 20.0 to 30.0% by mass, MgO in the range of 5.0 to 15.0% by mass, $Fe_2O_3$ in the range of 0 to 1.5% by mass, and $Na_2O$, $K_2O$, and $Li_2O$ in the range of 0 to 0.2% by mass in total to the total amount of glass fiber. The high-strength high-elastic-modulus glass composition is preferably a composition containing $Fe_2O_3$ in the range of 0.15 to 1.50% by mass, $ZrO_2$ in the range of 0.01 to 0.10% by mass, and $Na_2O$, $K_2O$, and $Li_2O$ in the range of 0.02 to 0.20% by mass to the total amount of glass fiber.

The high-elastic-modulus easy-production glass composition is a composition containing $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, and $B_2O_3$ in the range of 0.5 to 1.5% by mass, with the total of $SiO_2$, $Al_2O_3$, MgO, and CaO being in the range of 98.0% by mass or more, to the total amount of glass fiber.

The low-dielectric-constant low-loss-tangent glass composition is a composition containing $SiO_2$ in the range of 48.0 to 62.0% by mass, $B_2O_3$ in the range of 17.0 to 26.0% by mass, $Al_2O_3$ in the range of 9.0 to 18.0% by mass, CaO in the range of 0.1 to 9.0% by mass, MgO in the range of 0 to 6.0% by mass, $Na_2O$, $K_2O$, and $Li_2O$ in the range of 0.05 to 0.5% by mass in total, $TiO_2$ in the range of 0 to 5.0% by mass, SrO in the range of 0 to 6.0% by mass, $F_2$ and $Cl_2$ in the range of 0 to 3.0% by mass in total, and $P_2O_5$ in the range of 0 to 6.0% by mass to the total amount of glass fiber.

For the components of the glass compositions described above, content measurement can be performed with an ICP optical emission spectrometer for Li as a light element, and with a wavelength-dispersive X-ray fluorescence spectrometer for other elements. Specifically, content measurement for components of glass composition can be performed as follows.

First, a glass cloth is cut into pieces of appropriate size, and the pieces are then put in a platinum crucible and melted with stirring in an electric furnace with the temperature retained at 1400 to 1650° C. for 6 hours, giving homogenous molten glass. In the case that an organic substance is attaching to the surface of the glass cloth or in the case that glass fiber is contained in an organic substance (resin) mainly as a reinforcing material, the glass cloth is used after the organic substance has been removed, for example, by heating with a muffle furnace at 300 to 650° C. for about 2 to 24 hours.

Next, the resulting molten glass is poured out onto a carbon plate to form glass cullet, and the glass cullet is then powdered by crushing, giving glass powder. For Li as a light element, the glass powder is subjected to thermolysis with an acid, and quantitative analysis is then performed with an ICP optical emission spectrometer. For other elements, the glass powder is shaped into a disk with a pressing machine, and quantitative analysis is then performed with a wavelength-dispersive X-ray fluorescence spectrometer. Results of the quantitative analyses are converted into values in terms of oxide to calculate the amounts of components contained therein and the total amount, and from the numerical values, the component contents (% by mass) shown above can be determined.

Subsequently, the molten glass is discharged from a container (bushing) having a nozzle plate with several to several thousand nozzle tips, cooled while being stretched by winding at high speed, and solidified into a fibrous form (this operation may be called "spinning"), thereby forming glass filaments. The bushing is formed of a noble metal such as platinum.

Here, each glass filament that has been discharged from one nozzle tip or hole, cooled, and solidified normally has a perfect circular cross-sectional shape and a diameter in the range of 3.0 to 10.0 μm.

The elastic modulus of the glass fiber constituting the glass filaments is not limited, for example, in the range of 40 to 120 GPa, and preferably in the range of 71 to 110 GPa. The elastic modulus is more preferably in the range of 80 to 100 GPa because the effect of the present invention to reduce variation in impregnation time is more remarkable under the current tendency to require long resin impregnation time for warp glass strands. The strength of the glass fiber constituting the glass filaments is not limited, for example, in the range of 1.5 to 6.0 GPa, and preferably in the range of 3.5 to 5.2 GPa.

The elastic modulus and strength of the glass fiber constituting the glass filaments can be measured with methods described later in Examples.

Next, 20 to 300 filaments of the glass filaments formed as described above are coated with a binder (may be referred to as a primary sizing agent) by using an applicator to be bundled together, and wound around a collet to form a glass strand (glass fiber bundle).

If the fiber diameter of the glass filaments is more than 10 μm or the number of the glass filaments is more than 300 in the glass strand, glass cloths obtained by weaving such glass strands tend to fail in sufficient weight reduction. If the fiber diameter of the glass filaments is less than 3 μm in the glass strand, the production efficiency is lowered in order to prevent the generation of fluff and breakage; if the number of the glass filaments is less than 20, it is difficult as a tendency to prevent the generation of pinholes when a glass cloth obtained by weaving such glass strands is processed into a prepreg.

The fiber diameter of the glass filaments in the glass strand is preferably in the range of 3.0 to 10.0 μm, more preferably in the range of 4.8 to 9.0 μm, and further preferably in the range of 6.0 to 8.0 μm. The number of the glass filaments in the glass strand is preferably in the range of 20 to 300, and more preferably in the range of 120 to 250.

Next, the glass strands thus formed are divided into warp glass strands and weft glass strands, and the warp glass strands are coated with a warp-protecting agent (may be referred to as a secondary sizing agent given the term primary sizing agent). Examples of the warp-protecting agent can include a sizing agent whose film-forming agent component is starch-based or PVA (polyvinyl alcohol)-based. The warp-protecting agent may contain a lubricant, an emulsifying agent, a softener, a preservative, an antistatic agent, an organic solvent, and so on. Examples of the warp-protecting agent can include one containing 5.0% by mass of polyvinyl alcohol (PVA), 1.0% by mass of starch, 0.5% by mass of paraffin wax, and 93.5% by mass of water to the total amount of the warp-protecting agent, but are not limited thereto.

The amount of the warp-protecting agent attached to the glass cloth is preferably 0.1 to 3.0 parts by mass, and more preferably 0.5 to 1.5 parts by mass to 100 parts by mass of the glass strands.

Operations for coating the warp glass strands with the warp-protecting agent can be performed by passing the warp glass strands through a treatment tank accommodating a treatment solution containing the warp-protecting agent while the tension is adjusted, and then passing the warp glass strands through a dryer at an atmosphere temperature, for example, in the range of 100 to 250° C. for a time in the range of 0.1 to 1.0 minute with the line speed adjusted to give a specific dry strength index. The atmosphere temperature of the dryer is preferably in the range of 100 to 150° C., and the passing time is preferably in the range of 0.1 to 0.35 minutes. The dry strength index is expressed as the product of the drying time (min) and the atmosphere temperature (° C.) of the dryer, and is, for example, in the range of 25.0 to 35.0.

The warp glass strands are coated with the warp-protecting agent and conveyed with the tension adjusted, and as a result the arrangement of the glass filaments inside of the warp strands is loosened. The following drying promotes the film formation of the warp-protecting agent to fix the arrangement of the filaments, resulting in the local formation of the blocking. Here, the tension applied to the warp strands is preferably in the range of 70 to 120 N.

The term blocking refers to a tightly closed region surrounded by the outer peripheral surfaces of three or four glass filaments in the cross-section perpendicular to the length direction of a glass strand.

The larger the dry strength index of the warp glass strands is, the more the drying of the warp glass strands is promoted. As a result, the film formation of the warp-protecting agent is promoted on the outer peripheral parts of the warp glass strands, the shape of the strands is disadvantageously fixed before the arrangement of the glass filaments inside of the strands is loosened, and this results in a large number of blockings in the center part, causing a large blocking variance number. If the dry strength index is small, on the other hand, the drying of the warp-protecting agent is insufficient, and as a result the warp glass strands stick together to cause fluff and breakage when the warp threads are peeled apart in weaving.

The weft glass strands are coated only with the binder, and not coated with the warp-protecting agent at all.

Next, the warp glass strands as warp threads and the weft glass strands as weft threads are woven to successfully give a first glass cloth as one mode of the glass cloth of the present embodiment. The weaving can be performed with a known loom, and examples of the loom can include a jet loom such as an air-jet or water-jet loom, a shuttle loom, and a rapier loom. Styles of weaving with the loom can include plain weaves, satin weaves, mat weaves, and twill weaves, and plain weaves are preferred for production efficiency.

Subsequently, the first glass cloth is subjected to degrease treatment, surface treatment, or defibering treatment to successfully give a second glass cloth as one mode of the glass cloth of the present embodiment. The order of the degrease treatment, surface treatment, or defibering treatment is not limited, and any of the treatments may be performed first.

The degrease treatment causes the thermolysis of the binder and the warp-protecting agent attaching to the first glass cloth by placing the first glass cloth in a heating furnace at an atmosphere temperature in the range of 350 to 400° C. for a time in the range of 40 to 80 hours.

The surface treatment can be performed by soaking the first glass cloth in a surface treatment agent solution, squeezing out excessive moisture, and then heat-drying the first glass cloth at a temperature in the range of 80 to 180° C. for a time in the range of 1 to 30 minutes.

Applicable as the surface treatment agent solution is one containing a silane coupling agent, a weak acid (e.g., acetic acid, citric acid, propionic acid), and a surfactant.

Examples of the silane coupling agent can include aminosilane, chlorosilane, epoxysilane, mercaptosilane, vinylsilane, and (meth)acrylsilane. In the present embodiment, one of the silane coupling agents alone or a combination of two or more thereof may be used.

Examples of the aminosilane can include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane can include γ-chloropropyltrimethoxysilane.

Examples of the epoxysilane can include β-(3,4-epoxycyclohexyl)ethyltrimethoxysilane and γ-glycidoxypropyltrimethoxysilane.

Examples of the mercaptosilane can include γ-mercaptotrimethoxysilane.

Examples of the vinylsilane can include vinyltrimethoxysilane and N-β-(N-vinylbenzylaminoethyl)-γ-aminopropyltrimethoxysilane.

Examples of the (meth)acrylsilane can include γ-methacryloxypropyltrimethoxysilane.

Examples of the surfactant can include nonionic surfactants, cationic surfactants, anionic surfactants, and amphoteric surfactants. In the present invention, one of the surfactants alone or a combination of two or more thereof may be used.

Examples of the defibering treatment can include treatment to widen the widths of warp threads and weft threads through defibering by water flow pressure, defibering by high-frequency vibration with liquid as a medium, defibering by the pressure of a fluid with specific pressure, or defibering by pressurizing with rolls while a tension in the range of 30 to 200 N is applied to the warp threads of the first glass cloth.

In the first glass cloth or second glass cloth as one mode of the glass cloth of the present embodiment, the weave density of the warp threads or weft threads is, for example, in the range of 20 to 160 threads/25 mm, and preferably in the range of 50 to 80 threads/25 mm. The width of the warp threads or weft threads in the first glass cloth or the second glass cloth is, for example, in the range of 80 to 600 μm, preferably in the range of 250 to 450 μm, and more preferably in the range of 300 to 400 μm. The thickness of the first glass cloth or the second glass cloth is, for example, in the range of 8 to 200 μm, preferably in the range of 70 to 170 μm, and more preferably in the range of 91 to 140 μm. The width of the first glass cloth or second glass cloth is, for example, in the range of 800 to 2000 mm.

In the first glass cloth or the second glass cloth as one mode of the glass cloth of the present embodiment, the average number of rows, which is defined as (filament diameter)×(number of filaments)/(strand width), is, for example, in the range of 0.6 to 4.5, preferably in the range of 2.5 to 4.0, and more preferably in the range of 3.0 to 3.8. If the average number of rows is less than 0.6 in the first glass cloth or the second glass cloth, the blocking variance number is excessively small as a tendency; if the average number of rows is more than 4.5, long resin impregnation time is required for the first glass cloth or the second glass cloth as a tendency.

Count of the number of blockings can be performed as follows. First, a point 200 mm inside from one edge in the width direction of the glass cloth, a point 200 mm inside from the other edge, and a point at the center in the width direction of the glass cloth, three points in total, are set, and a part centered at each point and having a size of 100 mm×100 mm is cut out to give glass cloth pieces of 100 mm×100 mm in size. In the case that the width of the glass cloth is less than 800 mm, glass cloth pieces may be cut out with the distance from each edge and the size of the glass cloth pieces changed in proportion to the width with reference to the case that the width of the glass cloth is 1000 mm.

Next, the glass cloth pieces cut out are embedded in epoxy resin, the epoxy resin is cured, and the cured epoxy resin is polished to such a degree that a cross-section perpendicular to the length direction of the warp threads is observable, giving test pieces for blocking variance number measurement. Then, a warp glass strand present 5 mm away from one edge of each of the test pieces is selected, and the polished faces of the test pieces are observed with a scanning electron microscope at a magnification of 1600 times.

The blocking is maintained even after subjecting the first glass cloth after the weaving to the degrease treatment, surface treatment, or defibering treatment. Accordingly, the first glass cloth or the second glass cloth may be used for the measurement of the number of blockings.

Next, measurement of the number of blockings with the second glass cloth will be described.

FIG. 1 is a reproduction of an electron micrograph showing part of the polished face of any of the test pieces, showing a cross-section of the second glass cloth, wherein the reference numeral 1 indicates a warp glass strand, and the reference numeral 3 indicates a weft glass strand. The warp glass strand 1 is formed of a plurality of glass filaments 2 bundled together.

Figure 2:
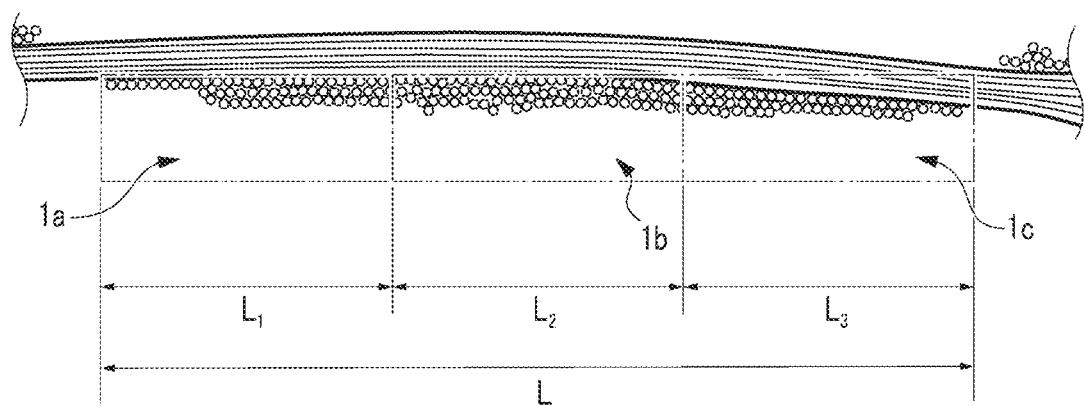
FIG. 2 is an illustrative diagram for a method for counting number of blockings.

Next, as illustrated in FIG. 2, the warp glass strand 1 having a width of L is divided into three regions of a left region 1a, a center region 1b, and a right region 1c in the width direction of the strand cross-section in such a manner that their widths $L_1$, $L_2$, and $L_3$ are equal ($L_1=L_2=L_3$, $L_1+L_2+L_3=L$), and the number of blockings is counted in each of the regions 1a, 1b, and 1c. Among the numbers of blockings in the three regions 1a, 1b, and 1c, the maximum value and the minimum value are denoted as $B_{max}$ and $B_{min}$, respectively, and the number of the glass filaments 2 included in the warp glass strand 1 as N, and $|B_{max}-B_{min}|/N$ is defined as the blocking variance number of the warp glass strand.

The measurement is performed for five adjacent warp glass strands in each of the glass cloth pieces cut out from the three points to determine the blocking variance numbers of the 15 warp glass strands in total, and the mean is defined as the blocking variance number of the glass cloth, and the standard deviation of the blocking variance numbers of the 15 warp glass strands is defined as the standard deviation of the blocking variance number of the glass cloth.

The standard deviation of the blocking variance number of the first glass cloth or the second glass cloth as one mode of the glass cloth of the present embodiment is preferably in the range of 0.006 to 0.070 and more preferably in the range of 0.016 to 0.022.

The prepreg or printed wiring board of the present embodiment includes the first glass cloth or the second glass cloth, and a thermoplastic resin or thermosetting resin with which the first glass cloth or the second glass cloth is impregnated.

In the prepreg or printed wiring board of the present embodiment, the resin with which the first glass cloth or second glass cloth described above is impregnated is not limited. For such resin, examples of the thermosetting resin can include epoxy resin, phenolic resin, unsaturated polyester resin, melamine resin, modified polyimide resin, thermosetting polyphenylene ether resin, and thermosetting modified polyphenylene ether resin. Examples of the thermoplastic resin can include polyamide resin, polyimide resin, polybutylene terephthalate resin, polyethylene terephthalate resin, polyphenylene sulfide resin, thermoplastic polyphenylene ether resin, thermoplastic modified polyphenylene ether resin, and fluororesin.

Next, examples of the present invention and comparative examples will be shown.

EXAMPLES

Example 1

First, glass strands each formed of 196 glass filaments bundled together was produced, wherein each of the glass filaments had a glass composition shown in Table 1 (high-strength high-elastic-modulus glass composition containing 65.00% by mass of $SiO_2$, 25.00% by mass of $Al_2O_3$, 9.50% by mass of MgO, 0.05% by mass of CaO, 0.30% by mass of $Fe_2O_3$, 0.05% by mass of $ZrO_2$, 0.10% by mass in total of $Li_2O$, $Na_2O$, and $K_2O$, 0.00% by mass of $B_2O_3$, 0.00% by mass of $TiO_2$, and 0.00% by mass of $F_2$ to the total amount of glass fiber) and had a perfect circular cross-sectional shape, and the filament diameter was 7.0 μm.

Next, a warp-protecting agent treatment solution containing a warp-protecting agent containing 5.0% by mass of polyvinyl alcohol (PVA), 1.0% by mass of starch, 0.5% by mass of paraffin wax, and 93.5% by mass of water to the total amount was prepared.

Subsequently, the glass strands formed as described above were divided into warp glass strands and weft glass strands, and the warp glass strands were coated with the warp-protecting agent. Operations for coating the warp glass strands with the warp-protecting agent were performed by passing the warp glass strands through a treatment tank accommodating the warp-protecting agent treatment solution and then passing through a dryer at an atmosphere temperature in the range of 100 to 150° C. with the line speed adjusted to give a dry strength index of 31.5.

The weft glass strands were coated only with the binder, and not coated with the warp-protecting agent at all.

Next, the warp glass strands as warp threads and the weft glass strands as weft threads were woven with an air-jet loom to give a plain-weave first glass cloth in which the weave density of the warp threads was 65 threads/25 mm and the weave density of the weft threads was 62 threads/25 mm.

Subsequently, the first glass cloth was subjected to degrease treatment, surface treatment, and defibering treatment to give a second glass cloth as a glass cloth of the present example. In the degrease treatment, the first glass cloth was placed in a heating furnace at an atmosphere temperature of 350° C. to 400° C. for 60 hours to cause the thermolysis of the binder and the warp-protecting agent attaching to the first glass cloth. The surface treatment was performed by coating the first glass cloth with a silane coupling agent and curing the silane coupling agent while the first glass cloth was continuously passed through a heating furnace at 130° C. The defibering treatment was performed by water flow pressure set to 3.0 MPa with application of a tension of 50 N to the warp threads of the first glass cloth. In the defibering treatment, values of tension detected by a tension detector were fed back to a guide roller to convey the first glass cloth, and the tension was adjusted by varying the position of the guide roller.

The tension applied to the warp threads of the glass cloth in the steps other than the defibering treatment was in the range of 70 to 120 N.

Through the treatments, the resulting second glass cloth included warp threads having a width of 372 μm and an average number of rows of 3.7 and weft threads having a width of 365 μm and an average number of rows of 3.8, and had a thickness of 96 μm. The results are shown in Table 1.

For the second glass cloth obtained in the present example, blocking variance numbers were measured with a method shown below, the standard deviation of the blocking variance numbers was determined, the glass fiber elastic modulus and glass fiber strength of the glass fiber constituting the second glass cloth were measured, and the resin impregnation time required for the second glass cloth was measured. The results are shown in Table 1.

Blocking Variance Numbers and Standard Deviation Thereof

First, a point 200 mm inside from one edge in the width direction of the second glass cloth, a point 200 mm inside from the other edge, and a point at the center in the width direction, three points in total, are set, and a part centered at each point and having a size of 100 mm×100 mm is cut out to give glass cloth pieces of 100 mm×100 mm in size. Next, the glass cloth pieces cut out are embedded in epoxy resin, the epoxy resin is cured, and the cured epoxy resin is polished to such a degree that a cross-section perpendicular to the length direction of the warp threads is observable, giving test pieces for blocking variance number measurement, and then a warp glass strand present 5 mm away from one edge of each of the test pieces is selected, and the polished faces of the test pieces are observed with a scanning electron microscope to count the number of blockings for each.

Count of the number of blockings is performed by dividing the warp glass strand 1 having a width of L into three regions of a left region 1a, a center region 1b, and a right region 1c in such a manner that their widths $L_1$, $L_2$, and $L_3$ are equal ($L_1=L_2=L_3$, $L_1+L_2+L_3=L$), and counting the number of blockings in each of the regions 1a, 1b, and 1c with a scanning microscope at a magnification of 1600 times.

Among the numbers of blockings in the three regions 1a, 1b, and 1c, the maximum value and the minimum value are denoted as $B_{max}$ and $B_{min}$, respectively, and the number of the glass filaments 2 included in the warp glass strand 1 as N, and $|B_{max}-B_{min}|/N$ is defined as the blocking variance number of the warp glass strand.

The measurement is performed for five adjacent warp glass strands in each of the glass cloth pieces cut out from the three points to determine the blocking variance numbers of the 15 warp glass strands in total, and the mean is defined as the blocking variance number of the second glass cloth.

The standard deviation of the blocking variance numbers of the 15 warp glass strands is defined as the standard deviation of the blocking variance number of the second glass cloth.

[Glass Fiber Strength]

First, a glass raw material formulated to have exactly the same glass composition as the glass fiber of an example or a comparative example was heated in a muffle furnace at 1400 to 1650° C. for 0.5 to 24 hours to give molten glass, and the obtained molten glass was poured out onto a carbon plate to form glass cullet. Next, the obtained glass cullet is loaded into a small cylindrical platinum bushing having one circular nozzle tip on the container bottom, and the bushing is heated to a specific temperature such that the viscosity of the loaded glass cullet reaches 1000±150 poise to melt the glass cullet, giving molten glass. The molten glass discharged from the nozzle tip of the platinum bushing is wound with a winding machine at a specific speed such that a glass fiber diameter of 13±2 μm results, and cooled and solidified while being stretched, giving a glass filament having a perfect circular cross-sectional shape. One glass filament (monofilament) between the nozzle tip of the platinum bushing and the winding machine is collected to get a glass filament with degradation due to contact or friction prevented as much as possible as a sample for evaluation of tensile strength. Next, the obtained glass filament is disposed on a mount, which includes two holding parts and two supporting parts described later, to superpose on a line from the center point on one short side of the mount to the center point on the other short side along the long-side direction, and adhered to give a monofilament test piece. Subsequently, the diameter of the obtained glass filament is measured with a scanning electron microscope (manufactured by Hitachi, Ltd., product name: S-3400), and the cross-sectional area of the glass filament is calculated from the obtained diameter. Thereafter, the two holding parts of the mount are set to upper and lower chucks of a tensile tester (manufactured by A&D Company, Limited, product name: Tabletop Material Testing Instrument STB-1225S) with the chuck-to-chuck distance set to 25 mm, the two supporting parts of the mount are removed by cutting, allowing the holding parts to be connected only through the glass filament, and tensile test is then carried out at a crosshead speed of 5 mm/min. Next, the maximum load value at rupture of the glass filament is divided by the cross-sectional area of the glass filament to calculate the tensile strength. Monofilament test pieces with the occurrence of slip-out or incomplete rupture such as bending during the measurement are excluded, and the mean of the tensile strength at n=30 is calculated to determine the glass fiber strength.

The mount has 25-mm short sides and 50-mm long sides, includes a cut-out part with 15-mm short sides and 25-mm long sides at the center of the inside with the short sides and long sides of the mount being respectively in parallel with the short sides and long sides of the cut-out part, includes a holding part to be set to a chunk of a tensile tester between each short side of the cut-out part and the corresponding short side of the mount, and includes a supporting part to connect the two holding parts to support them between each long side of the cut-out part and the corresponding long side of the mount.

[Glass Fiber Elastic Modulus]

First, tensile test is carried out for a glass filament in exactly the same manner as the above-described measurement method for glass fiber strength. Next, the stresses at strains between two points, $\varepsilon_1=0.0005$ and $\varepsilon_2=0.0025$, are determined as $\sigma_1$ and $\sigma_2$, respectively, and the stress difference $(\sigma_2-\sigma_1)$ is divided by the strain difference $(\varepsilon_2-\varepsilon_1)$ to calculate the tensile elastic modulus. Monofilament test pieces with the occurrence of slip-out during the measurement are excluded, and the mean of the tensile elastic modulus at n=15 is calculated to determine the glass fiber elastic modulus.

[Resin Impregnation Time]

First, a point 200 mm inside from one edge in the width direction of the second glass cloth, a point 200 mm inside from the other edge, and a point at the center in the width direction, three points in total, are set, and a part centered at each point and having a size of 60 mm×40 mm is cut out to give glass cloth pieces of 60 mm×40 mm in size as test pieces for evaluation on impregnation.

Next, each of the test pieces for evaluation on impregnation is soaked in benzyl alcohol, and the time from just the beginning of soaking to the completion of permeation through the test piece for evaluation on impregnation is measured for the warp direction and the weft direction. The measurement is carried out with five test pieces for evaluation on impregnation for each measurement point, and the mean is calculated for each measurement point.

Then, for the warp threads and the weft threads, the difference between the maximum value and minimum value of impregnation times at the measurement points is determined as the variation in impregnation time.

The refractive index of the benzyl alcohol approximates to that of glass filaments, and hence when the test pieces for evaluation on impregnation are soaked in benzyl alcohol, impregnated parts, in which benzyl alcohol has penetrated between glass filaments of glass strands, look transparent, and non-impregnated parts, in which refractive index difference is generated between glass filaments and air present between glass filaments, look opaque; accordingly, the presence or absence of impregnation can be visually confirmed with ease.

Example 2

In the present example, glass strands each formed of 41 glass filaments bundled together was produced, wherein each of the glass filament had a glass composition shown in Table 1 (E glass composition containing 54.60% by mass of $SiO_2$, 14.10% by mass of $Al_2O_3$, 1.20% by mass of MgO, 22.40% by mass of CaO, 0.20% by mass of $Fe_2O_3$, 0.00% by mass of $ZrO_2$, 0.50% by mass in total of $Li_2O$, $Na_2O$, and $K_2O$, 6.10% by mass of $B_2O_3$, 0.30% by mass of $TiO_2$, and 0.60% by mass $F_2$ to the total amount of glass fiber), and the filament diameter was 4.0 μm.

Next, the glass strands formed as described above were divided into warp glass strands and weft glass strands, and a plain-weave first glass cloth was obtained in exactly the same manner as in Example 1 except that the weave densities of the warp threads and the weft threads were each set to 95 threads/25 mm.

The first glass cloth was subjected to the degrease treatment, the surface treatment, and the defibering treatment in exactly the same manner as in Example 1 except that the water pressure in the defibering treatment was set to 1.0 MPa, giving a second glass cloth as a glass cloth of the present example.

The second glass cloth of the present example included warp threads having a width of 120 μm and an average number of rows of 1.4 and weft threads having a width of 185 μm and an average number of rows of 0.9, and had a thickness of 13 μm. The results are shown in Table 1.

Next, in exactly the same manner as in Example 1 except that the second glass cloth obtained in the present example was used, blocking variance numbers were measured, the standard deviation of the blocking variance numbers was determined, the glass fiber elastic modulus and glass fiber strength of the glass fiber constituting the second glass cloth were measured, and the resin impregnation time required for the second glass cloth was measured. The results are shown in Table 1.

Comparative Example 1

In the present comparative example, a second glass cloth as a glass cloth of the present comparative example was obtained in exactly the same manner as in Example 1 except that the line speed in the operations of coating warp glass strands with the warp-protecting agent was adjusted to give a dry strength index of 40.9.

The second glass cloth of the present comparative example included warp threads having a width of 374 km and an average number of rows of 3.7 and weft threads having a width of 360 μm and an average number of rows of 3.8, and had a thickness of 96 μm. The results are shown in Table 1.

Next, in exactly the same manner as in Example 1 except that the second glass cloth obtained in the present comparative example was used, blocking variance numbers were measured, the standard deviation of the blocking variance numbers was determined, the glass fiber elastic modulus and glass fiber strength of the glass fiber constituting the second glass cloth were measured, and the resin impregnation time required for the second glass cloth was measured. The results are shown in Table 1.

TABLE 1

|  |  | Example 1 | Example 2 | Comparative Example 1 |
|---|---|---|---|---|
| Glass composition | $SiO_2$ (% by mass) | 65.00 | 54.60 | 65.00 |
|  | $Al_2O_3$ (% by mass) | 25.00 | 14.10 | 25.00 |
|  | MgO (% by mass) | 9.50 | 1.20 | 9.50 |
|  | CaO (% by mass) | 0.05 | 22.40 | 0.05 |
|  | $Fe_2O_3$ (% by mass) | 0.30 | 0.20 | 0.30 |
|  | $ZrO_2$ (% by mass) | 0.05 | 0.00 | 0.05 |
|  | $Li_2O + Na_2O + K_2O$ (% by mass) | 0.10 | 0.50 | 0.10 |
|  | $B_2O_3$ (% by mass) | 0.00 | 6.10 | 0.00 |
|  | $TiO_2$ (% by mass) | 0.00 | 0.30 | 0.00 |
|  | $F_2$ (% by mass) | 0.00 | 0.60 | 0.00 |
|  | Total (% by mass) | 100.00 | 100.00 | 100.00 |
| Glass fiber elastic modulus (GPa) |  | 88 | 76 | 88 |
| Glass fiber strength (GPa) |  | 4.8 | 3.2 | 4.8 |
| Warp threads | Filament diameter (μm) | 7.0 | 4.0 | 7.0 |
|  | Number of filaments | 196 | 41 | 196 |
|  | Weave density (threads/25 mm) | 65 | 95 | 65 |
|  | Width (μm) | 372 | 120 | 374 |
|  | Average number of rows | 3.7 | 1.4 | 3.7 |
| Weft threads | Filament diameter (μm) | 7.0 | 4.0 | 7.0 |
|  | Number of filaments | 196 | 41 | 196 |
|  | Weave density (threads/25 mm) | 62 | 95 | 62 |
|  | Width (μm) | 365 | 185 | 360 |
|  | Average number of rows | 3.8 | 0.9 | 3.8 |
| Thickness (μm) |  | 96 | 13 | 96 |
| Blocking variance number |  | 0.059 | 0.050 | 0.094 |
| Standard deviation of blocking variance number |  | 0.019 | 0.011 | 0.030 |
| Impregnation time | Warp threads | Impregnation time at cloth edge (min) | 6.5 | 3.1 | 6.5 |
|  |  | Variation in impregnation time (min) | 0.0 | 0.1 | 1.5 |
|  | Weft threads | Impregnation time at cloth edge (min) | 6.0 | 0.2 | 6.0 |
|  |  | Variation in impregnation time (min) | 0.0 | 0.0 | 0.5 |

Table 1 shows that each of the glass cloths in Example 1 and Example 2 had a blocking variance number in the range of 0.027 to 0.077, and as a result the variation in resin impregnation time for warp glass strands was 1.0 minute or less; thus, it is clear that the glass cloths in Example 1 and Example 2 are capable of preventing unevenness of the impregnation time. For the glass cloth in Comparative Example 1, on the other hand, the impregnation times at the cloth edge in warp glass strands and weft glass strands were comparable to those in Example 1, and the variation in impregnation time for weft threads was 1.0 minute or less, but the blocking variance number was 0.094, which was more than 0.077, and as a result the variation in resin impregnation time for warp glass strands was 1.5 minute, which was larger than those for the glass cloths in Example 1 and Example 2; thus, it is clear that the glass cloth in Comparative Example 1 undergoes unevenness of the impregnation time.

The invention claimed is:

1. A glass cloth comprising glass strands as warp threads and weft threads, the glass strands each being composed of a plurality of glass filaments, wherein
the glass cloth has a blocking variance number in a range of 0.027 to 0.077, the blocking variance number represented by the following expression (1):

$$|B_{max}-B_{min}|/N \ldots \quad (1)$$

wherein, assuming that a warp glass strand is divided into three regions of a left region, a center region, and a right region with equal widths in a width direction of the warp glass strand, and number of blockings is counted in each of the regions, $B_{max}$ denotes a maximum value of number of blockings, $B_{min}$ denotes a minimum value of number of blockings, and N denotes number of glass filaments included in the warp glass strand.

2. A prepreg comprising the glass cloth according to claim 1.

3. A printed wiring board comprising the glass cloth according to claim 1.

* * * * *